(12) United States Patent
Maripudi (10) Patent No.: US 7,648,166 B2
(45) Date of Patent: Jan. 19, 2010

(54) OCCUPANT PROTECTION APPARATUS

(75) Inventor: Vivekananda S. Maripudi, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 593 days.

(21) Appl. No.: 10/908,268

(22) Filed: May 4, 2005

(65) Prior Publication Data
US 2006/0249939 A1    Nov. 9, 2006

(51) Int. Cl.
*B60R 21/233* (2006.01)
(52) U.S. Cl. .............. 280/740; 280/729; 280/728.3
(58) Field of Classification Search ........... 280/729, 280/728.2, 728.3, 731, 743.1, 740
See application file for complete search history.

(56) References Cited

U.S. PATENT DOCUMENTS

| | | | | |
|---|---|---|---|---|
| 3,632,135 A | * | 1/1972 | Chute et al. ............... 280/731 |
| 3,727,942 A | | 4/1973 | Arntson et al. ............ 280/731 |
| 3,752,501 A | * | 8/1973 | Daniel et al. .............. 280/729 |
| 3,819,203 A | | 6/1974 | Radke et al. ............... 280/731 |
| 3,819,205 A | * | 6/1974 | Dunford et al. ........... 280/731 |
| 3,836,169 A | | 9/1974 | Schiesterl ................. 280/731 |
| 3,895,823 A | | 7/1975 | Stephenson ............... 280/731 |
| 3,984,126 A | | 10/1976 | Goetz et al. ............... 280/740 |
| 4,006,918 A | | 2/1977 | MacFarland .............. 280/729 |
| 4,013,305 A | | 3/1977 | Ichihara ................... 280/742 |
| 4,903,986 A | * | 2/1990 | Cok et al. ................. 280/728.2 |
| 5,018,762 A | | 5/1991 | Suzuki et al. ............. 280/731 |
| 5,073,418 A | * | 12/1991 | Thornton et al. ......... 428/34.9 |
| 5,078,423 A | | 1/1992 | Fujita ....................... 280/743 |
| 5,160,164 A | | 11/1992 | Fischer et al. ............ 280/743 |
| 5,172,933 A | | 12/1992 | Strasser .................... 280/740 |
| 5,172,934 A | | 12/1992 | Frantz et al. .............. 280/740 |
| 5,186,489 A | * | 2/1993 | Imai ......................... 280/728.2 |
| 5,211,422 A | | 5/1993 | Frantz et al. .............. 280/740 |
| 5,249,824 A | * | 10/1993 | Swann et al. ............. 280/729 |
| 5,280,954 A | * | 1/1994 | Henseler et al. ......... 280/743.1 |
| 5,282,646 A | * | 2/1994 | Melvin et al. ............ 280/729 |
| 5,435,594 A | | 7/1995 | Gille ........................ 280/728.2 |
| 5,464,250 A | | 11/1995 | Sato ......................... 280/743.1 |
| 5,492,362 A | | 2/1996 | Lehman et al. .......... 280/739 |
| 5,494,314 A | | 2/1996 | Kriska et al. ............. 280/740 |
| 5,518,266 A | * | 5/1996 | O'Docherty et al. ..... 280/728.2 |
| 5,560,649 A | | 10/1996 | Saderholm et al. ...... 280/743.1 |
| 5,573,270 A | * | 11/1996 | Sogi et al. ................ 280/740 |
| 5,636,861 A | | 6/1997 | Orsulak et al. ........... 280/730.1 |
| 5,713,598 A | * | 2/1998 | Morita et al. ............ 280/743.1 |
| 5,848,805 A | | 12/1998 | Sogi et al. ................ 280/743.2 |

(Continued)

*Primary Examiner*—Paul N. Dickson
*Assistant Examiner*—Timothy Wilhelm
(74) *Attorney, Agent, or Firm*—Foley & Lardner LLP (57) ABSTRACT

First and second panels of air bag material are secured to one another with at least one seam defining a portion of a perimeter of a cavity bounded by the first and second panels, which is open along at least one unseamed portion extending along the first and second panels between endpoints of at least one seam. An opening in the second panel receives an end portion of an air bag inflator. Inflation gas generated by the air bag inflator is discharged into the air bag through the at least one unseamed portion, at least one of which is oriented downwards when installed in a vehicle. An air bag module cover incorporates first and second laterally opening door portions and a lower downward opening door portion that provide for a downward and outward initial deployment of the air bag.

26 Claims, 8 Drawing Sheets

U.S. PATENT DOCUMENTS

| | | | |
|---|---|---|---|
| 5,913,535 A | 6/1999 | Taguchi et al. | 280/729 |
| 5,957,485 A * | 9/1999 | Hirai | 280/729 |
| 5,957,486 A | 9/1999 | Taguchi et al. | 280/729 |
| 6,022,046 A * | 2/2000 | Isomura et al. | 280/743.2 |
| 6,086,092 A * | 7/2000 | Hill | 280/729 |
| 6,089,599 A | 7/2000 | Schimmoller et al. | 280/740 |
| 6,112,634 A * | 9/2000 | Head | 87/13 |
| 6,149,184 A * | 11/2000 | Ennis et al. | 280/728.2 |
| 6,170,857 B1 | 1/2001 | Okada et al. | 280/728.1 |
| 6,209,911 B1 * | 4/2001 | Igawa et al. | 280/740 |
| 6,213,496 B1 | 4/2001 | Minami et al. | 280/729 |
| 6,224,101 B1 | 5/2001 | Nishijima et al. | 280/743.2 |
| 6,241,283 B1 | 6/2001 | Zarazua | 280/743.2 |
| 6,247,727 B1 | 6/2001 | Hamada et al. | 280/743.2 |
| 6,260,881 B1 | 7/2001 | Ellerbrok et al. | 280/740 |
| 6,267,408 B1 * | 7/2001 | Jarboe et al. | 280/729 |
| 6,283,499 B1 * | 9/2001 | Nelsen et al. | 280/729 |
| 6,302,433 B1 | 10/2001 | Ellerbrok et al. | 280/729 |
| 6,345,841 B2 * | 2/2002 | Igawa et al. | 280/740 |
| 6,352,284 B1 | 3/2002 | Okada et al. | 280/743.1 |
| 6,361,067 B1 * | 3/2002 | Varcus et al. | 280/729 |
| 6,371,509 B1 | 4/2002 | Ellerbrok et al. | 280/729 |
| 6,371,510 B1 * | 4/2002 | Marriott et al. | 280/730.1 |
| 6,382,662 B1 * | 5/2002 | Igawa | 280/729 |
| 6,382,664 B1 * | 5/2002 | Hirano et al. | 280/730.2 |
| 6,471,239 B1 | 10/2002 | Nishijima et al. | 280/729 |
| 6,471,244 B1 | 10/2002 | Nishijima et al. | 280/742 |
| 6,478,331 B1 | 11/2002 | Lang | 280/740 |
| 6,557,891 B2 | 5/2003 | Okada et al. | 280/743.1 |
| 6,568,708 B2 | 5/2003 | Miodek et al. | 280/740 |
| 6,585,290 B2 | 7/2003 | Pinsenschaum et al. | 280/740 |
| 6,598,903 B2 | 7/2003 | Okada et al. | 280/743.2 |
| 6,612,609 B1 | 9/2003 | Rodriguez et al. | 280/729 |
| 6,626,459 B2 * | 9/2003 | Takimoto et al. | 280/731 |
| 6,648,366 B2 * | 11/2003 | Dillon et al. | 280/729 |
| 6,676,158 B2 * | 1/2004 | Ishikawa | 280/743.1 |
| 6,846,004 B2 * | 1/2005 | Parker | 280/728.1 |
| 6,848,714 B2 * | 2/2005 | Varcus | 280/743.1 |
| 6,926,303 B2 * | 8/2005 | Fischer et al. | 280/729 |
| 7,390,013 B2 * | 6/2008 | Chavez et al. | 280/728.3 |
| 2002/0027350 A1 | 3/2002 | Pinsenschaum et al. | 280/740 |
| 2002/0033590 A1 | 3/2002 | Adkisson | 280/740 |
| 2003/0151233 A1 * | 8/2003 | Varcus | 280/729 |

\* cited by examiner

OCCUPANT PROTECTION APPARATUS

DESCRIPTION OF EMBODIMENT(S)

Figure 1:
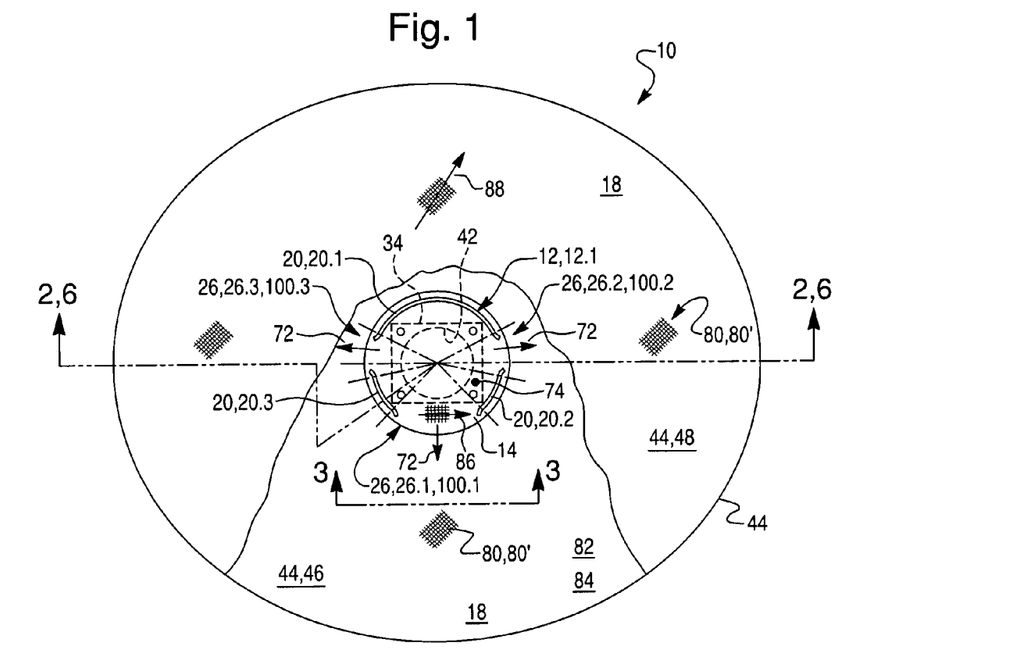
FIG. 1 illustrates a plan view of an air bag assembly and a fragmentary section thereof.
Figure 2:
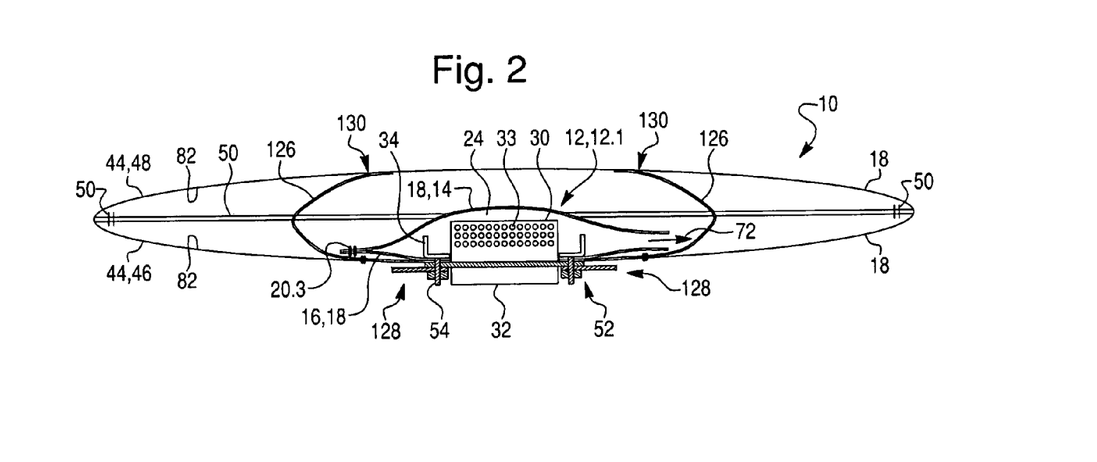
FIG. 2 illustrates a first cross-sectional view of the air bag assembly illustrated in FIG. 1.
Figure 3:
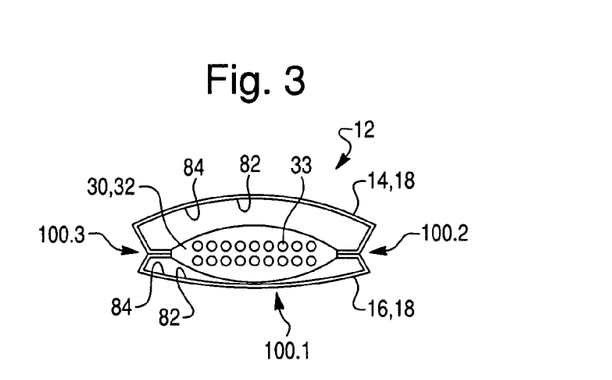
FIG. 3 illustrates a side view of a diffuser portion of the air bag assembly illustrated in FIG. 1.
Figure 4:
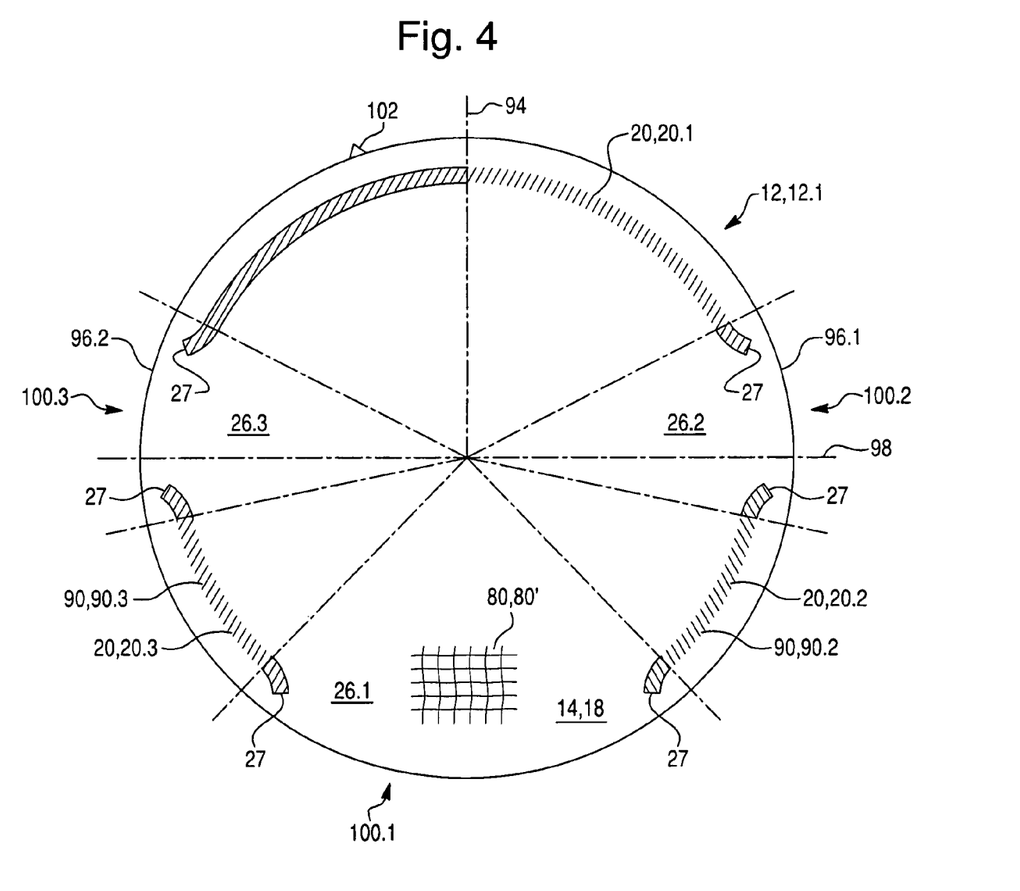
FIG. 4 illustrates a top view of a first embodiment of a diffuser.
Figure 5:
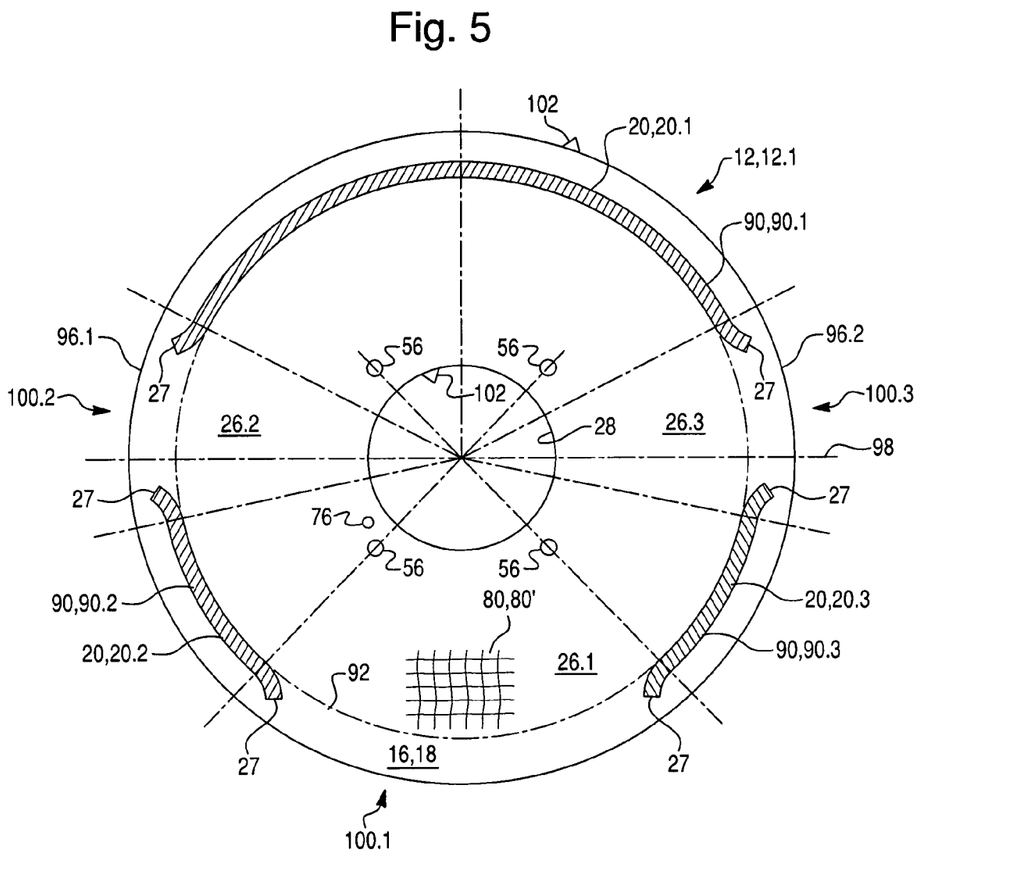
FIG. 5 illustrates a bottom view of the first embodiment of the diffuser.
Figure 6:
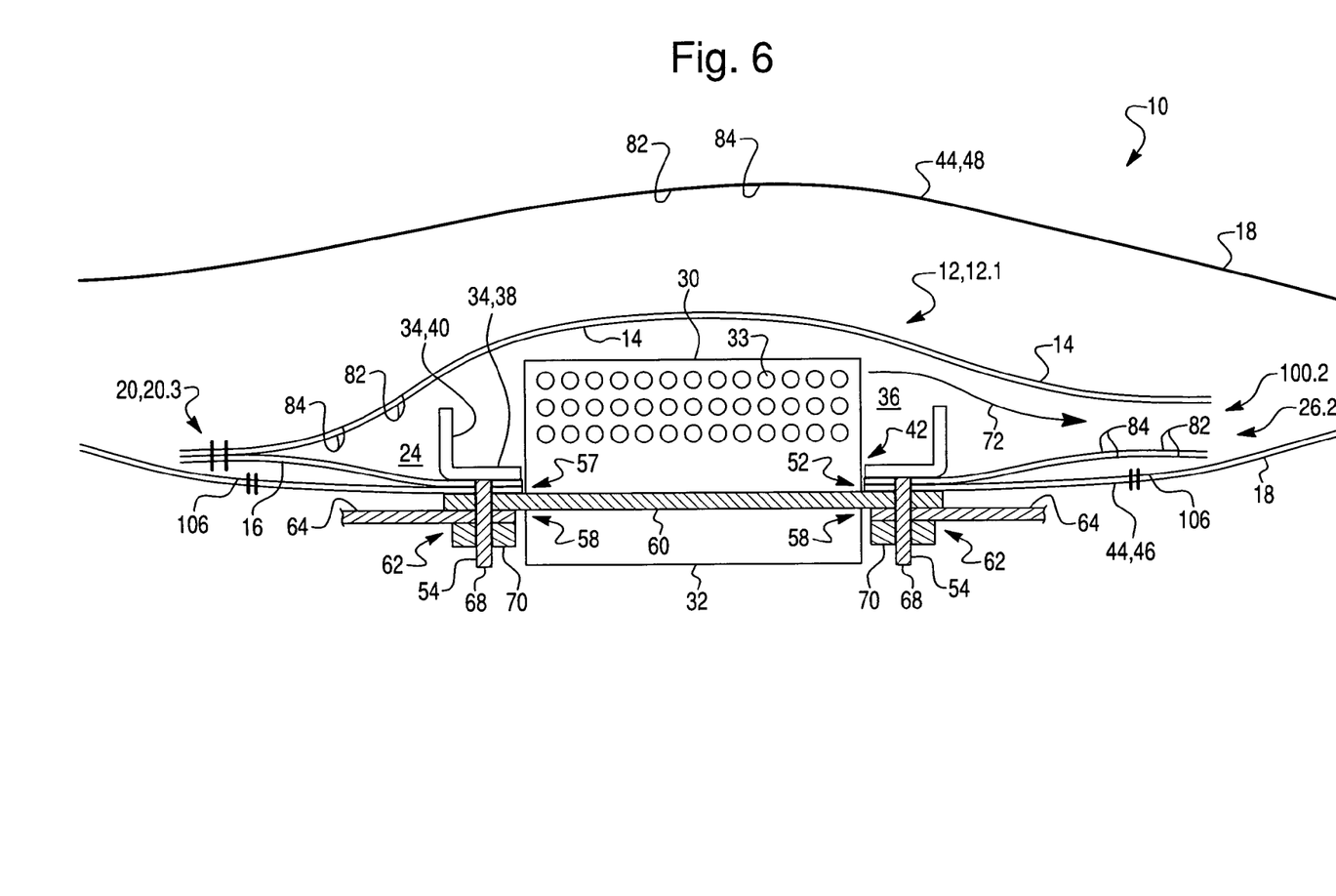
FIG. 6 illustrates a detailed cross-sectional view corresponding to FIG. 2.
Figure 11:
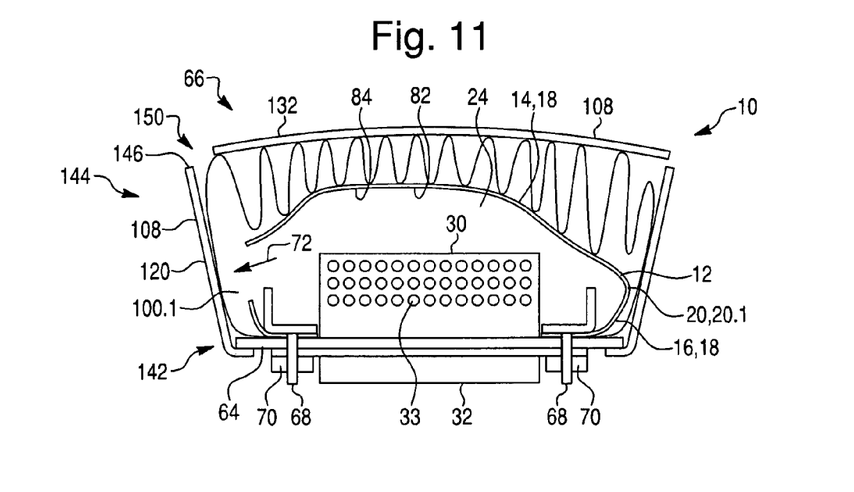
FIG. 11 illustrates a cross-sectional view of the air bag inflator module undergoing an early stage of inflation.

Referring to FIGS. 1-6, an occupant protection apparatus 10 comprises a diffuser 12 comprising first 14 and second 16 panels of air bag material 18 attached to one another with at least one seam 20 defining a portion of a perimeter 22 of a cavity 24 bounded by the first 14 and second 16 panels and open along at least one unseamed portion 26 extending along the first 14 and second 16 panels between endpoints 27 of the at least one seam 20. The second panel 16 incorporates a first inflator opening 28 adapted to receive an outlet end portion 30 of an air bag inflator 32 containing a plurality of discharge orifices 33 of the air bag inflator 32, wherein all of the discharge orifices 33 of the air bag inflator 32 are located within the cavity 24 upon assembly thereof therewith. A retaining structure 34 located on an inside 36 of the cavity 24 comprises a plate portion 38 and a deflection ring 40, wherein the plate portion 38 incorporates a second inflator opening 42 adapted to receive the outlet end portion 30 of the air bag inflator 32 therethrough. The diffuser 12 with the retaining structure 34 therein is located within an air bag 44 constructed of third 46 and fourth 48 panels of air bag material 18, for example, sewn together along a peripheral seam 50, wherein the third panel 46 incorporates a third inflator opening 52 adapted to receive the outlet end portion 30 of the air bag inflator 32 therethrough. The plate portion 38 of the retaining structure 34 incorporates, or is adapted to receive, a plurality of fasteners 54 outside the periphery of the second inflator opening 42, which are adapted to engage corresponding first holes 56 in the second panel 16 of the diffuser 12 outside the periphery of the first inflator opening 28, and which are adapted to engage corresponding holes 57 in the third panel 46 of the air bag 44 outside the periphery of the third inflator opening 52, corresponding holes 58 in a flange 60 extending from the periphery of the air bag inflator 32, and corresponding mounting holes 62 in a structural portion 64 of an air bag inflator module 66. Accordingly, the retaining structure 34 and associated fasteners 54 provide for clamping portions of the second panel 16 of the diffuser 12 and the third panel 46 of the air bag 44 between the plate portion 38 of the retaining structure 34 and the flange 60 extending from the air bag inflator 32, and provide for mounting the assembly of the diffuser 12, air bag 44, and air bag inflator 32 to the structural portion 64 of the air bag inflator module 66. For example, as illustrated in FIGS. 2, 6 and 11, the fasteners 54 may comprise threaded studs 68 attached to the plate portion 38 of the retaining structure 34, which cooperate with associated nuts 70. It should be understood that the fasteners 54, are not limited to any particular type, and, for example, could be selected from any combination of threaded screws or bolts with associated nuts, threaded studs with associated nuts, studs with push-on nuts, rivets, pins, snap-tabs, or some other fastening system.

Upon assembly, the outlet end portion 30 of the air bag inflator 32 extends through the third inflator opening 52 in the third panel 46 of the air bag 44, through the first inflator opening 28 in the second panel 16 of the diffuser 12, through the second inflator opening 42 in the plate portion 38 of the retaining structure 34, and into the cavity 24 within the diffuser 12 so that all of the discharge orifices 33 of the air bag inflator 32 become located within the cavity 24. Upon actuation of the air bag inflator 32, for example, responsive to a crash, inflation gas 72 generated by the air bag inflator 32 is discharged from the discharge orifices 33 at the outlet end portion 30 of the air bag inflator 32, at least a portion of which inflation gas 72 is deflected by the deflection ring 40 of the retaining structure 34 that extends towards the inside 36 of the cavity 24 from the plate portion 38 of the retaining structure 34, so as to mitigate against direct impingement of the inflation gas 72 against the air bag material 18 so as to mitigate against a premature failure thereof. The retaining structure 34 further comprises an indexing tab 74 extending from the plate portion 38 of the retaining structure 34 and adapted to cooperate a second hole 76 in the second panel 16 of the diffuser 12 outside the perhiphery of the first inflator opening 28 therein, and with corresponding holes in the third panel 46 of the air bag 44 and the flange 60 extending from the air bag inflator 32, so as to provide for aligning the air bag inflator 32 with the diffuser 12 and with the air bag 44. Inflation gas 72 discharges from the cavity 24 of the diffuser 12 through the at least one unseamed portion 26 thereof, at least one of which is oriented substantially downwards when the diffuser 12 is installed within the air bag 44 and the air bag 44 is installed in a vehicle 78.

The air bag material 18 of the first 14 and second 16 panels may, for example, comprise any material known for use in the construction of air bags, for example, either fabrics or non-woven materials, coated or uncoated. For example, in one embodiment, the air bag material 18 comprises a fabric 80 is coated with a silicone coating material 82 on at least a first surface 84 thereof, wherein the first surface 84 of the first 14 and second 16 panels are each oriented so as to face towards the cavity 24, and the woven fibers 80' of the fabric 80 are oriented in a direction 86 that is substantially oblique with respect to a direction 88 of woven fibers in the air bag 44. Other coatings may be used, for example, neoprene. Alternatively, the air bag material 18 may be an uncoated fabric, or a non-woven material.

Referring to FIGS. 1, 4 and 5, in accordance with a first embodiment of the diffuser 12.1, the at least one seam 20 comprises a plurality of seams 20 extending along a corresponding a plurality of circular arcs 90, each substantially along a common circle 92 substantially centered about the first inflator opening 28, wherein, for example, a first seam 20.1 extends over a first circular arc 90.1 of about 120 degrees centered about a vertical axis 94, so as to provide for substantially blocking an upward flow of inflation gas 72 form the diffuser 12. For example, the seams 20 may be sewn with stitching, for example, lock stitching, along one, two or more lines, or some pattern of stitching. The first embodiment of the diffuser 12.1 further comprises second 20.2 and third 20.2 seams along corresponding second 90.2 and third 90.3 circular arcs, each on opposing lateral sides 96.1, 96.2 of the diffuser 12 and extending downwards over about a 30 degree arc commencing about 15 degrees below the horizontal axis 98. The arrangement of the first 20.1, second 20.2, and third 20.3 seams provides for corresponding first 26.1, second 26.2 and third 26.3 unseamed portions that constitute corresponding first 100.1, second 100.2 and third 100.3 outlets from the diffuser, wherein the first outlet 100.1 is located substantially downwards over about a 90 degree arc and provides for a substantially downward flow of inflation gas 72 from the diffuser 12.1, and the second 100.2 and third 100.3 outlets provide for a substantially lateral flow of inflation gas 72 therefrom—slightly upwardly directed—in both lateral directions. Generally, the first circular arc 90.1 could extend over a range as small as about 60 degrees and as large as about 270 degrees, for which in the latter case, the at least one seam 20 would constitute a single seam 20.1.

Referring to FIGS. 4-6, the diffuser 12 may be constructed with a plurality of first panels 14 and a plurality of second panels 16, so as to provide for also shielding the air bag 44 from the heat of the air bag inflator 32. Furthermore, the first inflator opening 28 in the second panel 16, and or the outer periphery of the first 14 and second 16 panels, may incorporate corresponding at least one witness tab 102 so as to provide for aligning the first 14 and second 16 panels, and the associated directions 86 of the associated woven fibers 80' during an associated assembly operation.

Figure 7:
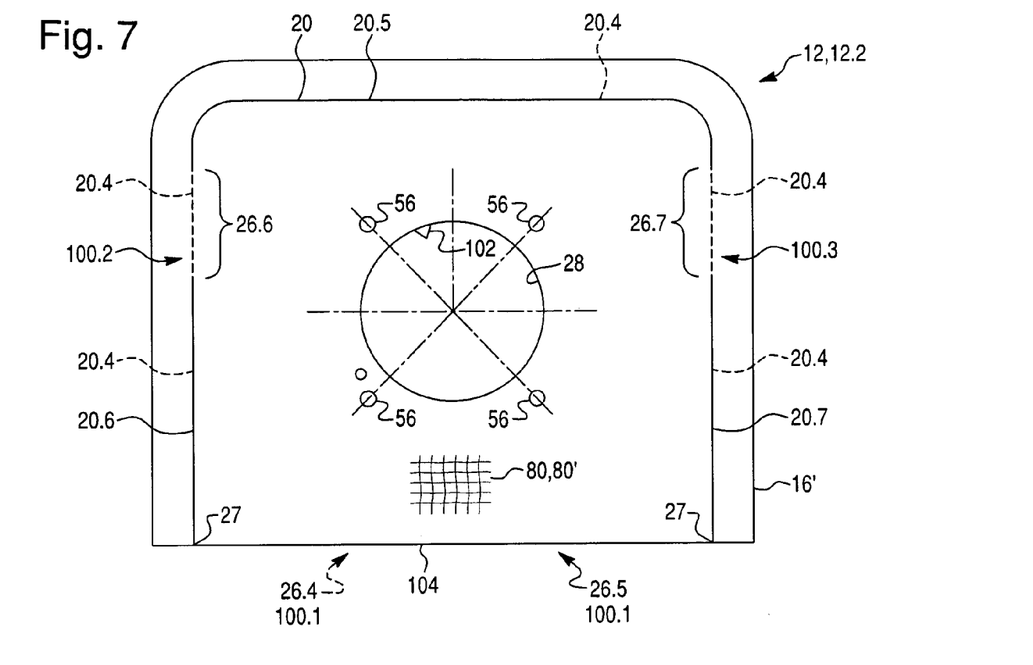
FIG. 7 illustrates a bottom view of a second embodiment of a diffuser.
Figure 8:
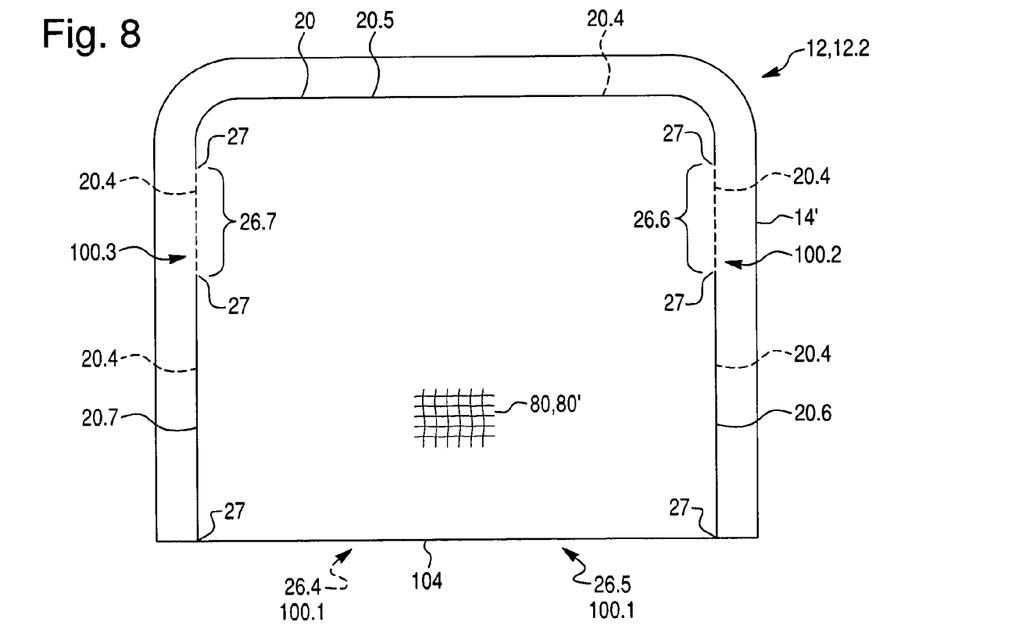
FIG. 8 illustrates a top view of the second embodiment of the diffuser.

In the first embodiment of the diffuser 12.1, the first 14 and second 16 panels are illustrated, for example, as substantially circular. Referring to FIGS. 7 and 8, in accordance with a second embodiment of a diffuser 12.2, the associated first 14' and second 16' panels are rectangular shaped with either a corresponding single seam 20.4 proximate to the periphery thereof so as to provide for a single unseamed portion 26.4 and a corresponding single outlet 100.1 at the bottom 104 of the diffuser 12.2; or alternatively, with a plurality of seams 20.5, 20.6 and 20.7 and associated unseamed portions 26.5, 26.6, 26.7 and a corresponding plurality of outlets 100.1, 100.2, 100.3 directed downwards and latarally outwards respectively.

In accordance with a method of providing an occupant protection apparatus 10, at least one each of first 14 and second 16 panels are provided, and a first inflator opening 28 and a plurality of first holes 56 and a second hole 76 are punched in the at least one second panel 16. The first 14 and second 16 panels are joined together along at least one seam 20 so as to form a diffuser 12, wherein the at least one seam 20 is adapted so as to leave at least one unseamed portion 26 extending along the at least one first panel and the at least one second panel between endpoints of the at least one seam 20. For example, the at least one seam 20 may comprises a plurality of seams 20, each along a circular arcs 90 of a common circle 92. A third inflator opening 52 and holes corresponding to the first holes 56 and second hole 76 are punched in a third panel 46 of air bag material 18—which may be reinforced with a reinforcement 106, e.g. constructed of air bag material 18 sewn to the third panel 46, in the region of the third inflator opening 52—and the diffuser 12 is tacked to the third panel 46 after aligning the first 28 and third 52 inflator openings. A fourth panel 48 is then sewn to the third panel 46 along a common periphery so as to form an air bag 44. A retaining structure 34 is inserted through the first 28 and third 52 inflator openings within the cavity 24 defined within the diffuser 12. An outlet end portion 30 of an air bag inflator 32 is inserted through the first 28 and third 52 inflator openings and through a second inflator opening 42 in a plate portion 38 of the retaining structure 34, and the third panel 46 of the air bag 44 and the second panel 16 of the diffuser 12 are then clamped between the plate portion 38 of the retaining structure 34 and a flange 60 extending from the air bag inflator 32 using fasteners 54 through the first holes 56. The retaining structure 34 may incorporate a deflection ring 40 to provide for deflecting some or all of the inflation gas 72 generated by the air bag inflator 32 so as to mitigate against the direct impingement of the hot inflation gas 72 against associated components constructed of air bag material 18. The air bag 44 is installed in an air bag inflator module 66 in a vehicle 78 so that at least one unseamed portion 26.1 and a corresponding outlet 100.1 are oriented substantially downwards.

Figure 9:
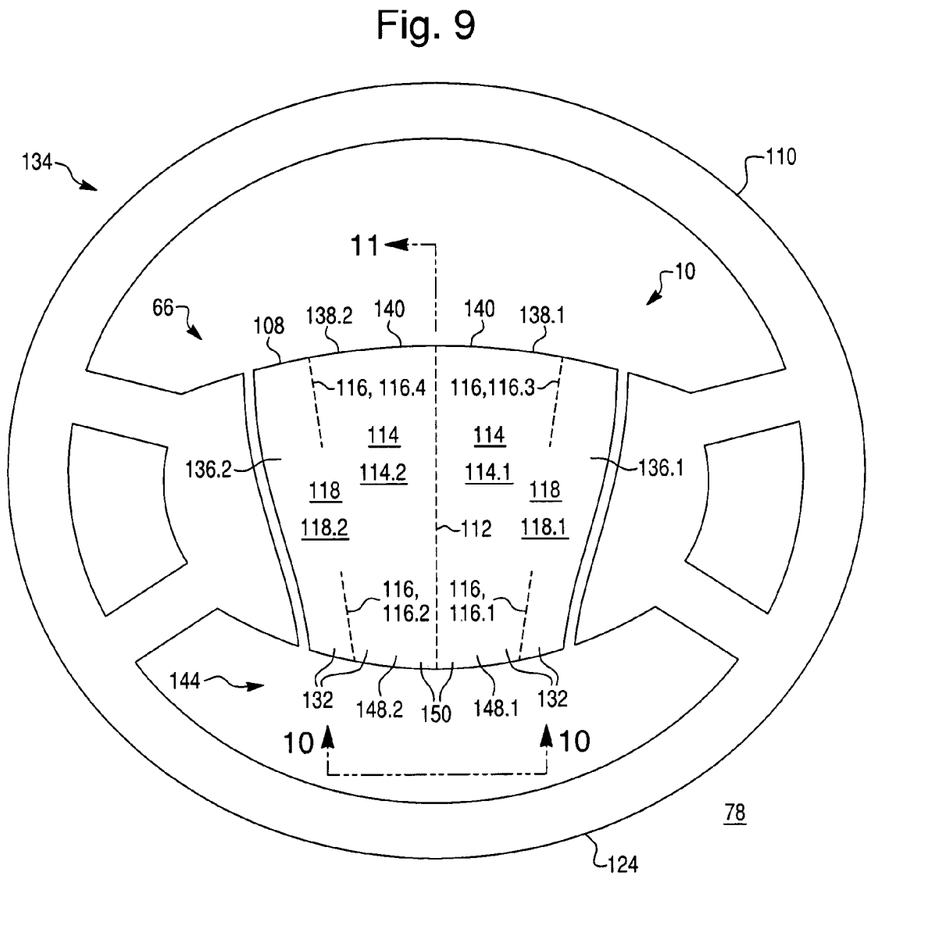
FIG. 9 illustrates a plan view of a steering wheel assembly containing an air bag inflator module.
Figure 10:
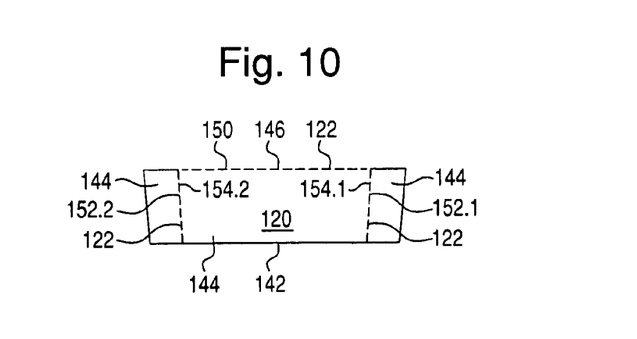
FIG. 10 illustrates an end view of an air bag inflator module cover incorporated in the air bag inflator module illustrated in FIG. 9.

Referring to FIGS. 9 and 10, the air bag inflator module 66 is enclosed with an associated air bag module cover 108, and is installed in a steering wheel 110 of the vehicle 78. The air bag module cover 108 is adapted with a conventional vertical tear seam 112 which provides for laterally opening door portions 114, each of which incorporates upper and lower vertical tear portions 116 above and below the associated hinge portion 118. The air bag module cover 108 is also adapted with a lower door portion 120 and associated tear seams 122, which, is adapted to open downwards responsive to the downwards flow of inflation gas 72 from the diffuser 12. For example, the air bag module cover 108 could be constructed from a molded plastic, foam or composite material.

Figure 12:
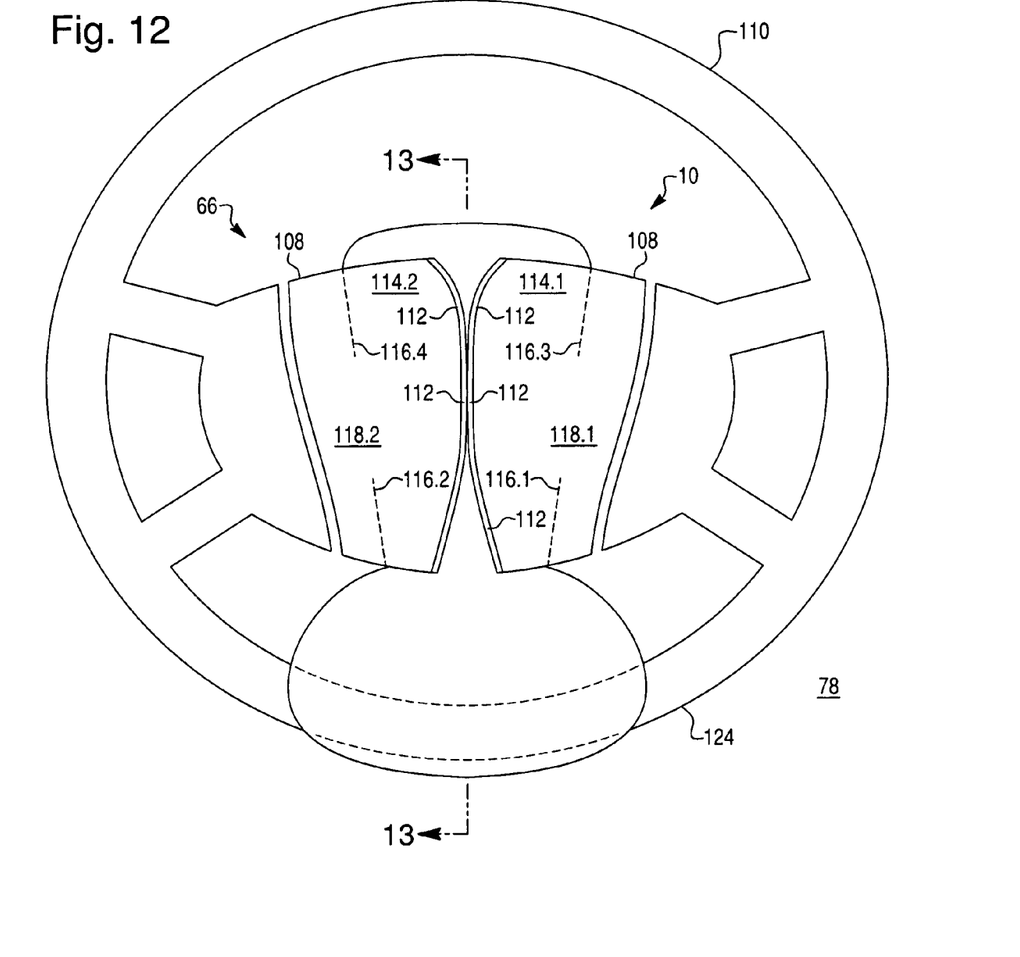
FIG. 12 illustrates a plan view of the steering wheel assembly illustrated in FIG. 9, wherein the air bag inflator module is undergoing a subsequent stage of inflation to that illustrated in FIG. 11.
Figure 13:
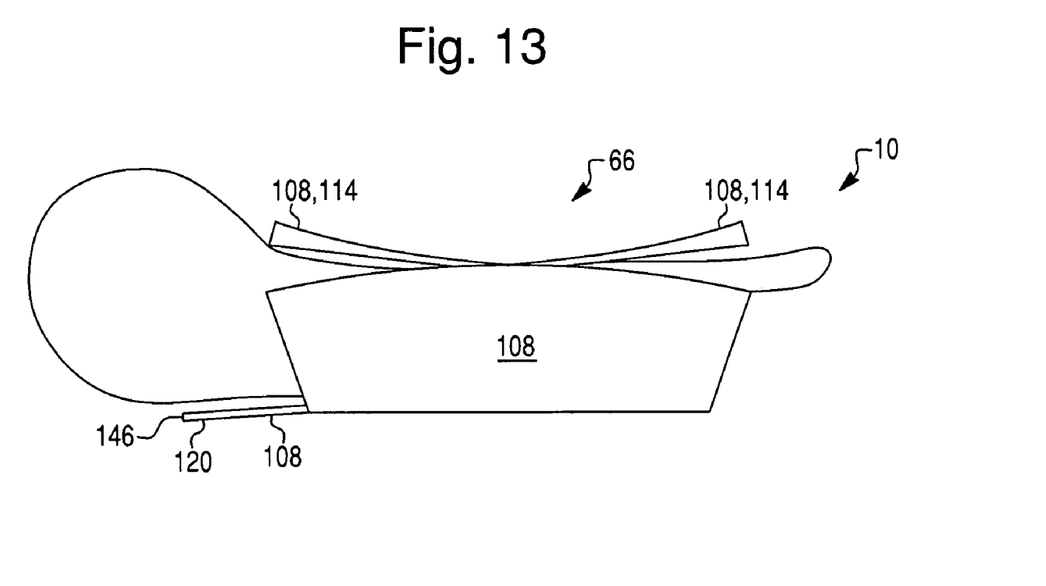
FIG. 13 illustrates a side view of the air bag inflator module illustrated in FIG. 12.

Referring to FIGS. 11-13, the volume of the cavity 24 of the diffuser 12 is substantially smaller than the volume of the associated air bag 44, but is sufficiently large so that the initial inflation of the cavity 24 by the air bag inflator 32 is sufficient to burst the tear seams 112, 122 of the air bag module cover 108 without relying upon a flow of inflation gas 72 to, and a resultant filling of, the remainder of the air bag 44. The predominant downward flow of inflation gas 72 from the diffuser 12 causes the air bag 44 to initially inflate predominantly in a downward direction, which provides for reducing occupant chest displacement and provides for protection of the occupant from the lower rim 124 of the steering wheel 110.

Referring to FIG. 2, the air bag 44 may incorporate one or more tethers 126 to provide for controlling the deployment characteristics thereof, for example, to limit the depth of the deployed air bag 44 between the steering wheel 110 and the occupant. For example, a plurality of tethers 126 may be incorporated between the third 46 and fourth 48 panels of the air bag 44, so as to be operative between a first region 128 proximate to third inflator opening 52 in the third panel 46 of the air bag 44 clamped by the retaining structure 34, and a second region 130 of the fourth panel 48 of the air bag 44. For example, the tethers 126 could be constructed of air bag material 18, e.g. fabric 80, the ends of which are sewn to the respective first 128 and second 130 regions of the third 46 and fourth 48 panels of the air bag 44.

Referring again to FIGS. 9-11, the air bag module cover 108 comprises a face panel 132 operatively coupled to a structural portion 64 of an air bag inflator module 66, wherein the face panel 132 in a nominal orientation 134 comprises first 114.1 and second 114.2 lateral door portions and a lower door portion 120. The first 114.1 and second 114.2 lateral door portions are each operatively coupled to respective first 136.1 and second 136.2 laterally distal portions of the face panel 132 by corresponding first 118.1 and second 118.2 distal hinge portions, and are separated from one another by a central substantially vertical tear seam 112, wherein the first 136.1 and second 136.2 laterally distal portions of the face panel 132 are on opposing lateral sides of the face panel 132. First 116.1 and second 116.2 lower vertical distal tear portions are each located below the respective first 118.1 and second 118.2 distal hinge portions, wherein the first lower vertical distal tear portion 116.1 is located between the first laterally distal portion 136.1 of the face panel 132 and the first lateral door portion 114.1, and the second lower vertical distal tear portion 116.2 is located between the second laterally distal portion of the face panel 132 and the second lateral door portion 114.2. Respective first 138.1 and second 138.2 upper edges of the first 114.1 and second 114.2 lateral door portions are bounded by a separable upper boundary 140, for example, an associated tear seam in the air bag module cover 108 or a cosmetically hidden separation of the first 138.1 and second 138.2 upper edges of the first 114.1 and second 114.2 lateral door portions from a proximal portion of the air bag module cover 108.

The lower door portion 120 is operatively coupled to the air bag inflator module 66 through a lower hinge portion 142 operatively coupled to a structural portion 64 of the air bag inflator module 66, for example, through the air bag module cover 108, wherein the lower door portion 120 is located on a bottom side 144 of the air bag module cover. A first edge 146 of the lower door portion 120 abuts respective first 148.1 and second 148.2 lower edges of the first 114.1 and second 114.2 lateral door portions at a separable lower boundary 150, wherein the first edge 146 of the lower door portion 120 is distal with respect to the lower hinge portion 142, and the lower door portion 120 comprises first 152.1 and second 152.2 lateral separable boundaries defining first 154.1 and second 154.2 lateral edges of the lower door portion 120. For example, the separable lower boundary 150 and the first 152.1 and second 152.2 lateral separable boundaries may comprise either associated tear seams in the air bag module cover 108 or corresponding cosmetically hidden separations, or a combination thereof.

The air bag inflator module 66 incorporating the air bag module cover 108 incorporates an air bag 44 incorporating either a diffuser 12—or a deflector comprising an above-described diffuser 12 for which all of the inflation case is directed substantially downwards through a single associated outlet 100.1—adapted to direct a substantial portion of inflation gas 72 in a downward direction into the air bag 44 when the air bag 44 is operatively coupled to an air bag inflator 32 and the air bag inflator 32 is actuated so as to generate the inflation gas 72. Referring to FIGS. 11-13, upon actuation, the first 116.1 and second 116.2 lower vertical distal tear portions and the separable lower boundary 150 and the first 152.1 and second 152.2 lateral separable boundaries either rupture or become separated so as to provide for the lower portions of the first 114.1 and second 114.2 lateral door portions to open laterally, and for the lower door portion 120 to open downwards, thereby providing for the air bag 44 to initially deploy downwards and outwards through the lower portion of the air bag module cover 108, after which the vertical tear seam 112, and the separable upper 140 boundary either rupture or become separated thereby enabling the first 114.1 and second 114.2 lateral door portions to open so as to provide for a completion of the deployment of the air bag 44.

The air bag module cover 108 may also incorporate first 116.3 and second 116.4 upper vertical distal tear portions above the respective first 118.1 and second 118.2 distal hinge portions, wherein the first upper vertical distal tear portion 116.3 is located between the first laterally distal portion 136.1 of the face panel 132 and the first lateral door portion 114.1, and the second upper vertical distal tear portion 116.4 is located between the second laterally distal portion 136.2 of the face panel 132 and the second lateral door portion 114.2, so as to provide for a relatively early opening of the top portions of the first 114.1 and second 114.2 lateral door portions during the inflation process.

While specific embodiments have been described in detail, those with ordinary skill in the art will appreciate that various modifications and alternatives to those details could be developed in light of the overall teachings of the disclosure. For example, although an embodiment the occupant protection apparatus 10 has been illustrated in the environment of a driver-side air bag inflation system, the particular application is not considered to be limiting, and it should be recognized that other applications are possible, for example, passenger-side or side-impact air bag inflation systems. Accordingly, the particular arrangements disclosed are meant to be illustrative only and not limiting as to the scope of the invention, which is to be given the full breadth of the appended claims, and any and all equivalents thereof.

What is claimed is:

1. An occupant protection apparatus, comprising:
    an air bag comprising at least one first panel constructed of air bag material and at least one second panel constructed of air bag material,
    wherein said at least one second panel comprises a first inflator opening adapted to receive an end portion of an air bag inflator, said at least one first panel is attached to said at least one second panel with at least one seam so as to form a first assembly, said at least one seam defines a portion of a perimeter of a cavity bounded by said at least one first panel and said at least one second panel, said cavity is open along at least one unseamed portion extending along said at least one first panel and said at least one second panel between endpoints of said at least one seam,
    wherein at least one of said unseamed portions is oriented substantially downwards when said first assembly is installed within said air bag and said air bag is installed in a vehicle so that a substantial portion of inflation gas produced by the air bag inflator is directed in a downward direction into the air bag so that the air bag is configured to initially inflate predominantly in a downward direction,
    wherein said air bag is assembled in an air bag inflator module adapted to be installed in a steering wheel of a vehicle, said air bag inflator module comprising a cover, said cover including a tear seam so as to provide for at least a portion of said air bag to inflate downwards relative to said air bag inflator module, said cover comprising a lower door portion located on a bottom side of said cover and front door portions located on a face panel of the cover that faces an occupant, wherein the lower door portion is configured so that the lower door portion opens and deploys before the front door portions, during a normal operation of the occupant protection apparatus.

2. An occupant protection apparatus as recited in claim 1, wherein said at least one first panel comprises a plurality of first panels adjacent and aligned with one another.

3. An occupant protection apparatus as recited in claim 1, wherein each of the first panel and second panel comprises at least one witness tab for aligning said first panel and said second panel during an associated assembly operation.

4. An occupant protection apparatus as recited in claim 1, wherein said at least one second panel comprises a plurality of second panels adjacent and aligned with one another.

5. An occupant protection apparatus as recited in claim 1, wherein at least one of said seams is oriented substantially across a top portion of the cavity when the air bag is installed in the vehicle so that the inflation gas is predominantly directed through the downward unseamed portion.

6. An occupant protection apparatus as recited in claim 5, wherein said air bag material comprises a fabric, wherein said fabric is coated with a silicone coating material on at least a first surface of said air bag material, wherein said first surface faces towards said cavity.

7. An occupant protection apparatus as recited in claim 5, wherein said air bag material comprises a fabric, wherein said fabric comprises woven fibers, and a direction of said woven fibers is oriented obliquely with respect to a direction of woven fibers in said air bag.

8. An occupant protection apparatus as recited in claim 1, wherein said at least one seam comprises at least one circular arc substantially centered about said first inflator opening.

9. An occupant protection apparatus as recited in claim 8, wherein said at least one circular arc spans a range greater than about 60 degrees and less than about 270 degrees along an upper portion of said first assembly.

10. An occupant protection apparatus as recited in claim 1, wherein said at least one seam comprises a plurality of seams, each of said plurality of seams comprises a circular arc substantially along a common circle substantially centered about said first inflator opening.

11. An occupant protection apparatus as recited in claim 1, wherein said at least one unseamed portion comprises a plurality of unseamed portions, and at least one of said plurality of unseamed portions is oriented in a direction having a substantial lateral component when said first assembly is installed within said air bag and said air bag is installed in said vehicle.

12. An occupant protection apparatus as recited in claim 1, wherein said at least one unseamed portion comprises a plurality of unseamed portions, and a plurality of said plurality of unseamed portions are oriented away from opposing lateral sides of said cavity when said first assembly is installed within said air bag and said air bag is installed in said vehicle.

13. An occupant protection apparatus as recited in claim 1, wherein a volume of said cavity is substantially less than a volume of the air bag, and said volume of said cavity is adapted so that an inflation of said cavity by said air bag inflator is sufficient to burst at least a portion of the cover at least partially containing said air bag.

14. An occupant protection apparatus as recited in claim 1, further comprising a retaining structure adapted to be located on an inside of said cavity of said first assembly so as to provide for securing said air bag inflator to said air bag and to said first assembly located within said air bag,
wherein said at least one second panel comprises at least one first hole adapted to receive a corresponding at least one fastener used to attached an air bag to said air bag inflator,
wherein said retaining structure comprises a plate portion adapted to clamp against said at least one second panel, said plate portion comprises a second inflator opening adapted to receive said end portion said air bag inflator therethrough, and said at least one fastener comprises a corresponding at least one stud secured to said plate portion of said retaining structure.

15. An occupant protection apparatus as recited in claim 14, wherein said retaining structure comprises a deflection ring adapted to deflect inflation gas generated by said air bag inflator, and said deflection ring extends towards an inside of said cavity from said plate portion of said retaining structure.

16. An occupant protection apparatus as recited in claim 14, wherein said retaining structure further comprises an indexing tab extending from said plate portion of said retaining structure, and said indexing tab is adapted to cooperate with said first assembly and at least one of said air bag and said air bag inflator so as to align said first assembly relative to at least one of said air bag and said air bag inflator.

17. An occupant protection apparatus as recited in claim 16, wherein said at least one second panel comprises a second hole adapted to cooperate with said indexing tab of said retaining structure.

18. An occupant protection apparatus as recited in claim 14, wherein said air bag comprises a third inflator opening adapted to receive said end portion of said air bag inflator, wherein said air bag inflator is adapted extend through said third inflator opening of said air bag into an interior of said air bag, and to generate inflation gas so as to provide for inflating said air bag and a portion of said at least one second panel is located between said retaining structure and said air bag.

19. An occupant protection apparatus as recited in claim 18, further comprising said air bag inflator, wherein a portion of said air bag proximate to said third inflator opening, and said portion of said at least one second panel located between said retaining structure and said air bag, are clamped between said retaining structure and a flange of said air bag inflator with said at least one fastener, and an outlet end portion of said air bag inflator is extended through said opening so that a discharge orifice of said air bag inflator is located within said cavity of said first assembly.

20. A method of providing an occupant protection apparatus, comprising:
providing at least a first and second panel of air bag material;
forming a first inflator opening in at least one second panel of air bag material;
attaching said at least one first panel of air bag material to said at least one second panel of air bag material along at least one seam so as to form a first assembly, wherein said at least one seam is adapted so as to provide for at least one unseamed portion extending along said at least one first panel and said at least one second panel between endpoints of said at least one seam;
inserting a retaining structure within a cavity bounded by said at least one first panel and said at least one second panel, wherein said retaining structure comprises a second inflator opening adapted to receive an outlet end portion of said air bag inflator;
either inserting said first assembly within an air bag or constructing the air bag around said first assembly, wherein said air bag comprises a third inflator opening adapted to receive said outlet end portion of said air bag inflator, wherein said air bag inflator is adapted to extend through said third inflator opening of said air bag into an interior of said cavity;
orienting said first assembly within said air bag so that at least one unseamed portion is oriented downwards when said air bag is installed in a vehicle so that a substantial portion of inflation gas produced by the air bag inflator is directed in a downward direction into the air bag so that the air bag is configured to initially inflate predominantly in a downward direction;

assembling said air bag in an air bag inflator module adapted to be installed in a steering wheel of a vehicle, wherein said air bag inflator module comprises an air bag module cover; and adapting said air bag module cover with a tear seam so as to provide for at least a portion of said air bag to inflate downwards relative to said air bag inflator module, wherein the module cover includes a lower door portion located on a bottom side of said air bag module cover and front door portions located on a face panel of the module cover that faces an occupant, wherein the lower door portion is configured so that the lower door portion opens and deploys before the front door portions; during a normal operation of the occupant protection apparatus.

21. A method of providing an occupant protection apparatus as recited in claim 20, wherein said at least one seam comprises at least one circular arc substantially centered about said first inflator opening.

22. A method of providing an occupant protection apparatus as recited in claim 20, further comprising adapting said retaining structure to deflect inflation gas away from said retaining structure, wherein said inflation gas is generated by said air bag inflator.

23. A method of providing an occupant protection apparatus as recited in claim 20, further comprising providing at least one tether in said air bag operative between a region proximate to said third inflator opening in said air bag and an exterior panel portion of said air bag.

24. A method of providing an occupant protection apparatus as recited in claim 20, further comprising assembling said air bag inflator module in said steering wheel of said vehicle.

25. An occupant protection apparatus as recited in claim 1, wherein the cover comprises a vertical tear seam for the front door portions and an upper boundary for an upper door portion, wherein the vertical tear seam and the upper boundary are configured to open and deploy after the lower door portion opens and deploys.

26. A method of providing an occupant protection apparatus as recited in claim 20, wherein the cover comprises a vertical tear seam for the front door portions and an upper boundary for an upper door portion, wherein the vertical tear seam and the upper boundary are configured to open after the lower door portion opens and deploys.

* * * * *